United States Patent
Tamura et al.

(10) Patent No.: US 9,972,829 B2
(45) Date of Patent: May 15, 2018

(54) NEGATIVE ELECTRODE CARBON MATERIAL FOR LITHIUM SECONDARY BATTERY AND METHOD FOR MANUFACTURING THE SAME, AND NEGATIVE ELECTRODE FOR LITHIUM SECONDARY BATTERY, AND LITHIUM SECONDARY BATTERY

(71) Applicant: NEC Corporation, Tokyo (JP)

(72) Inventors: Noriyuki Tamura, Tokyo (JP); Qian Cheng, Tokyo (JP); Ryota Yuge, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days. days.

(21) Appl. No.: 14/780,949

(22) PCT Filed: Mar. 28, 2014

(86) PCT No.: PCT/JP2014/059153
§ 371 (c)(1),
(2) Date: Sep. 28, 2015

(87) PCT Pub. No.: WO2014/157630
PCT Pub. Date: Oct. 2, 2014

(65) Prior Publication Data
US 2016/0056452 A1    Feb. 25, 2016

(30) Foreign Application Priority Data

Mar. 29, 2013  (JP) .................. 2013-074460

(51) Int. Cl.
*H01M 4/133*    (2010.01)
*H01M 4/1393*   (2010.01)
(Continued)

(52) U.S. Cl.
CPC ........ *H01M 4/133* (2013.01); *H01M 4/0404* (2013.01); *H01M 4/0471* (2013.01);
(Continued)

(58) Field of Classification Search
CPC .... H01M 4/04; H01M 4/0404; H01M 4/0471; H01M 4/133; H01M 4/1393;
(Continued)

(56) References Cited

U.S. PATENT DOCUMENTS

| | | |
|---|---|---|
| 5,965,296 A | 10/1999 | Nishimura et al. |
| 2003/0134201 A1 | 7/2003 | Sato et al. |

(Continued)

FOREIGN PATENT DOCUMENTS

| | | |
|---|---|---|
| JP | 5-234592 | 9/1993 |
| JP | 5-299074 | 11/1993 |

(Continued)

OTHER PUBLICATIONS

T. Takamura et al., "Identification of nano-sized holes by TEM in the graphene layer of graphite and the high rate discharge capability of Li-ion battery anodes", Electrochimica Acta, vol. 53, No. 3, pp. 1055-1061, Mar. 2007.

(Continued)

*Primary Examiner* — Karie O'Neill Apicella
(74) *Attorney, Agent, or Firm* — Finnegan, Henderson, Farabow, Garrett & Dunner, L.L.P.

(57) ABSTRACT

There is provided a negative electrode carbon material for a lithium secondary battery, including a graphite-based material in which holes are formed in a graphene layer plane.

11 Claims, 2 Drawing Sheets

(51) Int. Cl.
*H01M 4/04* (2006.01)
*H01M 4/36* (2006.01)
*H01M 4/587* (2010.01)
*H01M 10/0525* (2010.01)
*H01M 10/052* (2010.01)
*H01M 4/02* (2006.01)

(52) U.S. Cl.
CPC ......... *H01M 4/1393* (2013.01); *H01M 4/366* (2013.01); *H01M 4/587* (2013.01); *H01M 10/0525* (2013.01); *H01M 10/052* (2013.01); *H01M 2004/027* (2013.01)

(58) Field of Classification Search
CPC ...... H01M 4/366; H01M 4/525; H01M 4/587; H01M 10/0525
See application file for complete search history.

(56) References Cited

U.S. PATENT DOCUMENTS

| | | | |
|---|---|---|---|
| 2009/0061312 | A1* | 3/2009 | Zhamu ............... H01G 11/34 429/217 |
| 2012/0178001 | A1* | 7/2012 | Zhang ................ H01M 4/133 429/405 |
| 2012/0328951 | A1 | 12/2012 | Hirohashi et al. |
| 2014/0079932 | A1* | 3/2014 | Aksay ................ B82Y 30/00 428/219 |

FOREIGN PATENT DOCUMENTS

| | | |
|---|---|---|
| JP | 10-40914 | 2/1998 |
| JP | 10-284080 | 10/1998 |
| JP | 11-199211 A | 7/1999 |
| JP | 2000-311686 | 11/2000 |
| JP | 2001-176512 | 6/2001 |
| JP | 2004-200115 | 7/2004 |
| JP | 2005-108774 A | 4/2005 |
| JP | 2006-59558 | 3/2006 |
| JP | 2009-266795 | 11/2009 |
| JP | 2009-538813 | 11/2009 |
| JP | 2011-57541 | 3/2011 |
| JP | 2013-30472 | 2/2013 |

OTHER PUBLICATIONS

F. Yao et al., "Diffusion Mechanism of Lithium Ion through Basal Plane of Layered Graphene", J. Am. Chem. Soc., vol. 134, No. 20, pp. 8646-8654, 2012.

T. Matsumoto et al., "Structure and Evaluation of Graphite Basal Plane Where Lithium Ion Can Pass through", Dai 7 Kai Meeting on Materials for Chemical Batteries in Japan, Extended Abstract, pp. 23-24, Jun. 2005.

Y. Zhu et al., "Carbon-Based Supercapacitors Produced by Activation of Graphene", Science 332, pp. 1537-1541, 2011.

X. Zhao et al., "In-Plane Vacancy-Enabled High-Power Si-Graphene Composite Electrode for Lithium-Ion Batteries", Advanced Energy Materials, pp. 1, 1079-1084, 2011.

International Search Report dated Jun. 10, 2014 in corresponding PCT International Application.

Notification of Reasons for Refusal issued by Japanese Patent Office in counterpart Japanese Patent Application No. 2015-508768, dated Apr. 3, 2018.

* cited by examiner

NEGATIVE ELECTRODE CARBON MATERIAL FOR LITHIUM SECONDARY BATTERY AND METHOD FOR MANUFACTURING THE SAME, AND NEGATIVE ELECTRODE FOR LITHIUM SECONDARY BATTERY, AND LITHIUM SECONDARY BATTERY

CROSS-REFERENCE TO RELATED PATENT APPLICATIONS

This application is a National Stage Entry of International Application No. PCT/JP2014/059153, filed Mar. 28, 2014, which claims priority from Japanese Patent Application No. 2013-074460, filed Mar. 29, 2013. The entire contents of the above-referenced applications are expressly incorporated herein by reference.

TECHNICAL FIELD

The present invention relates to a negative electrode carbon material for a lithium secondary battery and a method for manufacturing the same, and a negative electrode for a lithium secondary battery, and a lithium secondary battery.

BACKGROUND ART

Lithium secondary batteries have the advantages of high energy density, little self-discharge, excellent long-term reliability and the like, and are therefore broadly put to practical use as batteries for small-size electronic devices such as laptops and cellular phones. In recent years, high functionalization of electronic devices and utilization of lithium secondary batteries for electric cars have progressed, and the development of higher-performance lithium secondary batteries is thus demanded.

At present, carbon materials are common as negative electrode active materials for lithium secondary batteries, and various types of carbon materials are proposed in order to improve the battery performance.

For example, Patent Literature 1 discloses an electrochemical power storage device using as an electrode active material a C/Si/O composite material obtained by impregnating a graphite having voids with an organosilicon compound selected from silanes and siloxanes, forming a crosslinked substance of the organosilicon compound, and heating the resultant (in a non-oxidizing gas, 600° C. to 1,400° C.) to react the crosslinked substance with the graphite. Patent Literature 1 further discloses that the use of the electrode active material particularly for a negative electrode of a lithium ion secondary battery can provide an electrochemical device having a high capacity and being excellent in cycle characteristics.

Patent Literature 2 discloses a negative electrode active material for a lithium secondary battery which contains a graphite core which can intercalate and deintercalate lithium and has pores running from its external surface to its interior, metal nanoparticles dispersively disposed in the pore interiors, and an amorphous carbon filled in the pore interiors. Patent Literature 2 also discloses that the use of the negative electrode active material for the lithium secondary battery improves the capacity maintenance rate and the charge and discharge efficiency.

Patent Literature 3 discloses a carbon material which has voids in its interior and contains metal-including hollow carbon particles containing a metal (silicon or the like) to form an alloy with lithium. Patent Literature 3 discloses that the carbon particle is formed by gathering up a large number of fine grains (matrixes composed of carbon) with a plurality of bores mutually connected in gaps between the grains, and that the carbon particle can further contain a conductive auxiliary agent such as graphite. Patent Literature 3 also discloses that such a carbon material is suitable as a negative electrode material for a lithium ion secondary battery, has a high lithium-intercalating and deintercalating capacity, and hardly damages even if being subjected to successive charges and discharges.

CITATION LIST

Patent Literature

Patent Literature 1: JP2006-059558A
Patent Literature 2: JP2009-266795A
Patent Literature 3: JP2011-057541A

SUMMARY OF INVENTION

Technical Problem

In recent years, there is a demand of lithium secondary batteries for a high input characteristic of enabling input in a short time after discharge. Lithium secondary batteries using a high-crystallinity graphite among carbon materials for a negative electrode active material can provide a high charge and discharge capacity, but cannot satisfy the input characteristic.

The object of the present invention is to solve the above-mentioned problem, that is, to provide a negative electrode carbon material capable of providing a lithium secondary battery improved in the input characteristic, and a negative electrode for a lithium secondary battery and a lithium secondary battery using the negative electrode carbon material.

Solution to Problem

An aspect of the present invention provides a negative electrode carbon material for a lithium secondary battery, including a graphite-based material wherein holes are formed in a graphene layer plane.

Another aspect of the present invention provides a negative electrode for a lithium secondary battery, including the above negative electrode carbon material.

Another aspect of the present invention provides a lithium secondary battery including the above negative electrode.

Another aspect of the present invention provides a method for manufacturing a negative electrode carbon material for a lithium secondary battery, the negative electrode carbon material including a graphite-based material in which holes are formed in a graphene layer plane; the method including: subjecting a graphite to an immersion treatment with an alkali aqueous solution containing an alkaline metal or an alkaline earth metal, separating the graphite, and thereafter subjecting the graphite to a heat treatment to form the holes.

Advantageous Effects of Invention

The exemplary embodiment can provide a negative electrode carbon material capable of providing a lithium secondary battery improved in the input characteristic, and a negative electrode for a lithium secondary battery and a lithium secondary battery using the negative electrode carbon material.

DESCRIPTION OF EMBODIMENT

Figure 1:
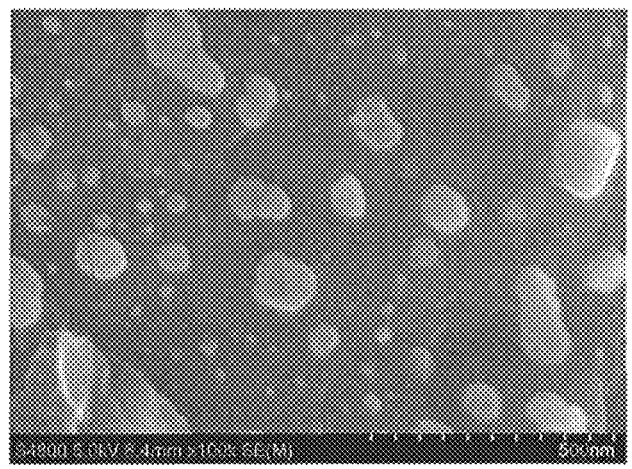
FIG. 1 is a SEM image of a graphite after a KOH aqueous solution treatment and before a heat treatment.

A negative electrode carbon material for a lithium secondary battery according to the exemplary embodiment includes a graphite-based material, use of which can more improve the input characteristic of the lithium secondary battery than use of usual graphite. The graphite-based material has holes formed in graphene layer planes. It is preferable that a plurality of holes be formed at least in the surface-side graphene layer, and it is more preferable that holes be formed in a plurality of graphene layers from the surface one to the inside ones.

Such holes can pass through lithium ions (Li ions), and can function as paths (Li paths) of Li ions into graphene interlayers.

In usual graphite, Li paths of Li ions into graphene interlayers are almost limited to paths from the edge surface-sides, and the distance to reach depths in the graphene interlayers (depths in the graphene layer plane direction) is long. Hence, when the amount reacting with lithium becomes large, the input characteristic lowers.

By contrast, in the graphite-based material according to the present exemplary embodiment, since the graphite-based material has, in addition to the Li paths from the edge surface-sides, holes functioning as Li paths in the graphene layer planes (basal surfaces), Li paths increase and paths reaching the depths in the graphene layers become short. Consequently, the input characteristic of a lithium secondary battery can be improved.

Such holes are formed preferably also in graphene layer planes present on the inner side than the surface-side graphene layer, more preferably at least in 3 layers from the surface layer to the inner sides, and still more preferably at least in 5 layers from the surface layer to the inner sides. Holes can be formed in more layers (for example, 10 layers) from the surface layer to the inner sides, and can also be formed in all graphene layers constituting a graphite-based material. Further holes can also be formed so as to penetrate through a plurality of graphene layers.

When such holes are formed in graphene layers, Li paths reaching the interior in the stacking direction (the perpendicular direction to the graphene layer planes) of the graphene layers are formed and the input characteristic can be improved more.

Holes in the graphene layer planes present in the inner sides than the surface layer can be observed by cutting a graphite-based material by various methods to expose a cross-section thereof, and observing the cross-section by an electron microscope such as TEM or SEM.

The hole-opening size of the holes formed in the graphene layers is not especially limited as long as being able to passing through lithium ions and not greatly degrading characteristics of the graphite due to the hole formation, but is preferably of a nanometer to micrometer size. Here, the nanometer size means a few nanometers (including 1 nm) to a few tens of nanometers (less than 50 nm); and the micrometer size means a few micrometers (including 1 μm) to a few tens of micrometers (less than 50 μm). For example, from the viewpoint of making lithium ions sufficiently pass through the holes, the hole-opening size is preferably 10 nm or larger, more preferably 50 nm or larger, and still more preferably 100 nm or larger. Further from the viewpoint of not degrading the characteristics of the graphite, the hole-opening size is preferably 1 μm or smaller, more preferably 800 nm or smaller, and still more preferably 500 nm or smaller. Here, the "hole-opening size" means a maximum length of a hole-opening (maximum hole-opening size), and corresponds to a diameter of a circle having a minimum area being able to accommodate the contour of a hole-opening. Further from the viewpoint of lithium ion passing, also a hole-opening size (minimum hole-opening size) corresponding to a diameter of a circle having a maximum area being able to be present on the inner side of the contour of the hole-opening is preferably 10 nm or larger, more preferably 50 nm or larger, and still more preferably 100 nm or larger.

The density of the number of holes having such hole-opening sizes is preferably in the range of 10 to 200 holes/μm$^2$, and more preferably in the range of 50 to 150 holes/μm$^2$. It is preferable that holes in the number density in this range be formed at least in a graphene layer of the surface side. When the number density of holes is too low, a sufficient effect of improving the input characteristic cannot be provided. Reversely when the number density of holes is too high, the specific surface area becomes too large and side-reactions in charge and discharge are liable to be caused, resulting that the charge and discharge efficiency decreases in some cases. The number density of holes can be determined as follows: 10 regions of 1 μm×1 μm of a surface of a graphite-based material in an electron microscope image thereof are arbitrary selected; the numbers of holes of 10 nm or larger in hole-opening size are counted for the each region; and they are averaged to obtain the number density of holes as an average value (holes/μm$^2$) for 10 regions.

The present exemplary embodiment can form a graphite-based material in which the number density of holes hardly varies from a surface layer nearly to a third layer of the inner side. Holes can further be formed which penetrate through a plurality of layers from a surface layer to the inner sides, and holes which reach nearly a 30th layer can even be formed. At this time, as going deeper from a surface layer to the inner sides, it is likely that the hole-opening size of holes becomes small and the number density of holes decreases. From the viewpoint of providing a sufficient hole-forming effect, it is preferable that the number density of holes be in the above range at least in graphene layers of a surface layer and the inner-side layer thereof; it is more preferable that the number density of holes be in the above range at least in graphene layers from a surface layer (first layer) to the third layer; it is still more preferable that the number density of holes be in the above range at least in graphene layers from a surface layer to the fifth layer; and the number density of holes may be made in the above range at least in graphene layers from a surface layer to the 10th layer.

Further, it is preferable that holes be formed so as to distribute over the whole surface of the graphene layer plane; and the uniform distribution thereof is more preferable. It is preferable that the interval between a plurality of holes (a minimum distance between hole-openings of adjacent holes, an average value) be in the range of 100 nm to 1,000 nm. When holes are thus formed, the input characteristic can be improved without impairing the battery characteristics due to the graphite characteristics. The hole interval can be determined as follows: 10 regions of 1 µm×1 µm of a surface of a graphite-based material in an electron microscope image thereof are arbitrary selected; the intervals between holes are measured for the each region; and they are averaged to obtain the hole interval as an average value for 10 regions.

The graphite-based material having such holes formed therein can be formed by subjecting a powdery graphite to an immersion treatment with an alkali aqueous solution, to a solid-liquid separation including filtration, and thereafter to a heat treatment.

As the alkali aqueous solution, there can be used one in which an alkaline metal compound, an alkaline earth metal compound or the like is dissolved in an aqueous solvent, but a KOH aqueous solution is preferable. The concentration of the alkaline metal compound and alkaline earth metal compound such as KOH can be set in the range of 0.1 M to 10 M.

The immersion time of the graphite in the alkali aqueous solution can be set in the range of 1 min to 24 hours; and as required, stirring can be carried out suitably during the immersion. The temperature of the alkali aqueous solution during the immersion can be set in the range of 10° C. to 60° C., and is preferably in the range of 20° C. to 50° C.

The heat treatment after the immersion treatment can be carried out in an inert atmosphere such as a nitrogen atmosphere or an argon atmosphere. The heat treatment temperature can be set in the range of 400° C. to 1,200° C., and preferably in the range of 800° C. to 1,000° C.; and the heat treatment time can be set to be 0.5 hours to 24 hours, preferably 0.5 to 5 hours, and still more preferably 1 to 3 hours. The graphite after the heat treatment can be washed with water and dried to thereby obtain a graphite-based material having holes formed therein.

For example, when a graphite is immersed in a KOH aqueous solution, KOH crystals are spottedly distributed and formed over the whole plane of a graphene layer (FIG. 1). In the heat treatment thereafter, a reaction represented by $2KOH+C \rightarrow 2K+H_2O+CO$ is caused. Then, carbon at positions where the KOH crystals are formed becomes deficient, or further carbon in their vicinity becomes deficient, whereby holes in the same size as or larger sizes than the KOH crystals are formed. Such a reaction can progress successively also in inner-side graphene layers to thereby form holes also in inner-side graphene layers. By controlling the heat treatment condition (particularly the heat treatment temperature), inlets of small holes which cannot house lithium ions are selectively expanded and become able to house lithium, whereby the battery characteristics can be improved. From this viewpoint, it is especially preferable that the heat treatment temperature be in the range of 800° C. to 1,000° C.

The hole-opening size, the number density and the distribution of holes depend on the size, the number density and the distribution of crystals of KOH crystals and the like, and can be controlled by immersion conditions such as the concentration of the alkali aqueous solution of KOH or the like, the immersion time, the immersion temperature and the stirring during the immersion. They can further be controlled by the heat treatment conditions, such as the heat treatment temperature, the heat treatment time and the atmosphere, after the immersion treatment.

The holes thus formed in graphene layers differ from voids intrinsic to graphite (voids between primary particles, defects, and voids and cracks in the edge vicinity). Even if a usual graphite having voids is used for a negative electrode, the input characteristic of the lithium secondary battery is low. Further even if a graphite after being subjected to a treatment of roughening the surface of the graphite (for example, after being immersed in an alkali solution, being subjected to a treatment of irradiating ultrasonic waves) is used for a negative electrode, the input characteristic of the lithium secondary battery is low. The activation treatment using a chemical activation method or a gas activation method, which is carried out in manufacture of active carbon, is a treatment for including expansion of voids formed by carbonization, opening of closed pores or adding much more pores in the voids; and even if such a usual activation treatment is carried out on graphite, it is difficult to obtain a lithium secondary battery having desired battery characteristics (particularly input characteristic).

According to the present exemplary embodiment, since holes can be formed in graphene layers without remarkably degrading the structure of the graphite, the input characteristic of a lithium secondary battery can be improved without greatly impairing the battery characteristics due to characteristics intrinsic to the graphite.

The graphite-based material after holes are formed in such a way according to the present exemplary embodiment can have a structure and physical properties corresponding to a graphite as a raw material. The interlayer spacing $d_{002}$ of the (002) planes of the graphite-based material according to the present exemplary embodiment is preferably 0.340 nm or smaller, and more preferably 0.338 nm or smaller; and since $d_{002}$ of graphite is 0.3354 nm, $d_{002}$ of the graphite-based material according to the present exemplary embodiment is preferably in the range of 0.3354 to 0.340 nm. The $d_{002}$ can be determined by X-ray diffractometry (XRD). Lc is preferably 50 nm or larger, and more preferably 100 nm or larger.

The graphite-based material according to the present exemplary embodiment can be used in a particulate form, from the viewpoint of the filling efficiency, the mixability, the formability and the like. The shape of the particle includes spherical ones, ellipsoidal ones and scaly ones. A usual globulizing treatment may be carried out.

The average particle diameter of the graphite-based material according to the present exemplary embodiment is preferably 1 µm or larger, more preferably 2 µm or larger, and still more preferably 5 µm or larger, from the viewpoint of suppressing side-reactions in the charge and discharge time to suppress the decrease of the charge and discharge efficiency, and preferably 40 µm or smaller, more preferably 35 µm or smaller, and still more preferably 30 µm or smaller, from the viewpoint of the input and output characteristic and the viewpoint of fabrication of an electrode (smoothness of an electrode surface, and the like). Here, the average particle diameter means a particle diameter (median diameter: $D_{50}$) at a cumulative value of 50% in a particle size distribution (in terms of volume) by a laser diffraction scattering method.

The BET specific surface area (based on a measurement at 77K by a nitrogen adsorption method) of the graphite-based material according to the present exemplary embodiment is preferably smaller than 10 m²/g, and more preferably 5 m²/g or smaller, from the viewpoint of suppressing side-reactions in the charge and discharge time to suppress the decrease of the charge and discharge efficiency. On the other hand, from the viewpoint of providing the sufficient input and output characteristic, the BET specific surface area is preferably 0.5 m²/g or larger, and more preferably 1 m²/g or larger.

In charge and discharge at potentials of 0 to 2 V vs. lithium, the graphite-based material according to the present exemplary embodiment preferably has the discharge capacity of 300 mAh/g or higher, and also preferably has the charge and discharge efficiency of preferably 80% or higher. There can be obtained, for example, a graphite-based material having a discharge capacity in the range of 300 mAh/g or higher and 372 mAh/g (theoretical capacity of graphite) or lower. Here, the charge and discharge efficiency means a value indicated at least in the charge and discharge in the initial stage at room temperature.

As a graphite as a raw material to be used for the graphite-based material according to the present exemplary embodiment, a natural graphite and an artificial graphite can be used. As the artificial graphite, there can be used usual products obtained by graphitizing a raw material such as a graphitizable carbon composed of, for example, coke. Also an artificial graphite having been subjected to a heat treatment in the range of 2,000 to 3,200° C. can be used.

The graphite-based material according to the present exemplary embodiment may have a metal alloyable with Li or an oxide thereof formed on the surface of the material. The metal or the metal oxide is capable of reacting with lithium, and is electrochemically active in charge and discharge of a lithium secondary battery. As such a metal or metal oxide, there can be used at least one metal selected from the group consisting of Si, Ge, Sn, Pb, Al, Ga, In and Mg, or an oxide thereof.

It is preferable that such a metal or metal oxide be formed in the circumference of holes formed in the graphite-based material.

The formation of such a metal or metal oxide enables the increase of the reaction capacity. Particularly the formation of a metal or metal oxide in the hole circumference enables the metal or metal oxide to more strongly bond with graphene layers in the hole circumference than in other sites, and thus can increase Li reaction sites excellent in reversibility to improve the reaction capacity.

Forming means of such a metal or metal oxide includes CVD (chemical vapor deposition method), sputtering, electroplating, electroless plating and a hydrothermal synthesis method.

The content of the metal or metal oxide in a negative electrode carbon material according to the present exemplary embodiment is preferably 0.1 to 30% by mass with respect to a graphite-based material. When the content is too low, a sufficient incorporation effect cannot be attained; and when the content is too high, the influence of the volume expansion and contraction in the charge and discharge time of the metal or metal oxide becomes large and the graphite-based material is liable to degrade.

The graphite-based material according to the present exemplary embodiment can be coated with an amorphous carbon. The amorphous carbon (amorphous carbon coat) coating the graphite-based material can suppress side-reactions of the graphite-based material with an electrolyte solution to be able to improve the charge and discharge efficiency and increase the reaction capacity. The above-mentioned graphite-based material having a metal alloyable with lithium (Li) or an oxide thereof formed on the material surface can also be coated with an amorphous carbon. Thereby, the reaction capacity can be more increased while side-reactions with an electrolyte solution are suppressed.

The thickness of the amorphous carbon coat is preferably 50 nm or smaller, more preferably 10 nm or smaller, and still more preferably 3 nm or smaller. When the thickness exceeds 50 nm, there arises such a risk that the capacity per mass becomes low. Further the thickness of the amorphous carbon coat is preferably 1 nm or larger. When the thickness is smaller than 1 nm, the uniformity of the coat decreases and there arises a risk of generating sites not being coated.

A method for coating the graphite-based material with an amorphous carbon (forming method of an amorphous carbon coat) includes a hydrothermal synthesis method, CVD and sputtering.

The formation of an amorphous carbon coat by the hydrothermal synthesis method can be carried out, for example, as follows. First, a powder of a graphite-based material having holes formed therein is immersed and mixed in a carbon precursor solution. Thereafter, the powder is separated by vacuum filtration. Then, the separated powder is subjected to a heat treatment in an inert atmosphere. Then, the obtained aggregates of the powder are crushed into a desired uniform particle diameter. As the carbon precursor solution, various types of sugar solutions can be used, and particularly a sucrose aqueous solution is preferable. The sucrose concentration of the aqueous solution can be set to be 0.1 to 10 M, and the immersion time can be set to be 1 min to 24 hours. The heat treatment can be carried out in an inert atmosphere such as nitrogen or argon at 400 to 1,200° C. for 0.5 to 24 hours.

It is preferable that the formation of an amorphous carbon coat be carried out before the formation of holes. In the case that an amorphous carbon coat is formed before the formation of holes, lithium ions can pass through the holes more smoothly since the amorphous carbon coat is not present in hole parts after the formation of holes, and the capacity and the rate characteristic can be improved consequently.

The graphite-based material described hitherto can be applied to a negative electrode active material of a lithium ion secondary battery, and can form a carbon-based negative electrode suitable for a lithium ion secondary battery. By using a negative electrode containing the graphite-based material as a negative electrode active material, a lithium ion secondary battery improved in the input characteristic can be provided.

A negative electrode for a lithium ion secondary battery can be fabricated, for example, by forming a negative electrode active material layer containing a negative electrode active material composed of the graphite-based material, and a binder, on a negative electrode current collector. The negative electrode active material layer can be formed by a usual slurry applying method. Specifically, a slurry containing a negative electrode active material, a binder and a solvent is prepared, applied on a negative electrode current collector, dried, and as required, pressed to thereby obtain a negative electrode. An applying method of the negative electrode slurry includes a doctor blade method, a die coater method, and a dip coating method. A negative electrode may be obtained by in advance forming a negative electrode active material layer, and thereafter forming a thin film of aluminum, nickel or an alloy thereof as a current collector by a method of vapor deposition, sputtering or the like.

The binder for the negative electrode is not especially limited, but includes polyvinylidene fluoride (PVdF), vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide, polyamideimide, methyl(meth)acrylate, ethyl(meth)acrylate, butyl(meth)acrylate, (meth)acrylonitrile, isoprene rubber, butadiene rubber, and fluororubber. As the slurry solvent, N-methyl-2-pyrrolidone (NMP) and water can be used. In the case of using water as the solvent, further as a thickener, there can be used carboxymethyl cellulose, methyl cellulose, hydroxymethyl cellulose, ethyl cellulose, or polyvinyl alcohol.

The content of the binder for the negative electrode is preferably in the range of 0.1 to 30 parts by mass with respect to 100 parts by mass of a negative electrode active material, more preferably in the range of 0.5 to 25 parts by mass, and still more preferably in the range of 1 to 20 parts by mass, from the viewpoint of the binding capability and the energy density, which are in a tradeoff relationship.

The negative electrode current collector is not especially limited, but, from the electrochemical stability, is preferably copper, nickel, a stainless steel, molybdenum, tungsten, tantalum or an alloy containing two or more thereof. The shape includes a foil, a flat plate and a mesh form.

A lithium ion secondary battery according to the present exemplary embodiment includes the negative electrode, a positive electrode and an electrolyte.

A positive electrode can be fabricated, for example, by preparing a slurry containing a positive electrode active material, a binder and a solvent (further as required, a conductive auxiliary agent), applying the slurry on a positive electrode current collector, drying, and as required, pressing the resultant to thereby form a positive electrode active material layer on the positive electrode current collector.

The positive electrode active material is not especially limited, but for example, a lithium composite oxide, an iron lithium phosphate and the like can be used. The lithium composite oxide includes lithium manganate ($LiMn_2O_4$); lithium cobaltate ($LiCoO_2$); lithium nickelate ($LiNiO_2$); compounds in which at least a part of manganese, cobalt or nickel of these lithium compounds is substituted with another metal element such as aluminum, magnesium, titanium or zinc; nickel-substituted lithium manganates in which a part of manganese of lithium manganate is substituted at least with nickel; cobalt-substituted lithium nickelates in which a part of nickel of lithium nickelate is substituted at least with cobalt; compounds in which a part of manganese of the nickel-substituted lithium manganates is substituted with another metal (for example, at least one of aluminum, magnesium, titanium and zinc); and compounds in which a part of nickel of the cobalt-substituted lithium nickelates is substituted with another metal (for example, at least one of aluminum, magnesium, titanium and zinc). These lithium composite oxides may be used singly or as a mixture of two or more. With respect to the average particle diameter of the positive electrode active material, the positive electrode active material having an average particle diameter, for example, in the range of 0.1 to 50 μm can be used, from the viewpoint of the reactivity with an electrolyte solution and the rate characteristic; the positive electrode active material having an average particle diameter in the range of 1 to 30 μm can be preferably used; and the positive electrode active material having an average particle diameter in the range of 5 to 25 μm can be more preferably used. Here, the average particle diameter means a particle diameter (median diameter: $D_{50}$) at a cumulative value of 50% in a particle size distribution (in terms of volume) by a laser diffraction scattering method.

The binder for the positive electrode is not especially limited, and the same ones as the binders for the negative electrode can be used. Among these, from the viewpoint of the versatility and the low cost, polyvinylidene fluoride is preferable. The content of the binder for the positive electrode is preferably in the range of 1 to 25 parts by mass with respect to 100 parts by mass of a positive electrode active material, more preferably in the range of 2 to 20 parts by mass, and still more preferably in the range of 2 to 10 parts by mass, from the viewpoint of the binding capability and the energy density, which are in a tradeoff relationship.

Binders other than polyvinylidene fluoride (PVdF) include vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide and polyamideimide. As a slurry solvent, N-methyl-2-pyrrolidone (NMP) can be used.

The positive electrode current collector is not especially limited, but from the viewpoint of the electrochemical stability, there can be used, for example, aluminum, titanium, tantalum, stainless steel (SUS), another valve metal or an alloy thereof. The shape includes a foil, a flat plate shape and a mesh form. Particularly an aluminum foil can suitably be used.

When a positive electrode is fabricated, a conductive auxiliary agent may be added for the purpose of reducing the impedance. The conductive auxiliary agent includes carbonaceous microparticles of graphite, carbon black, acetylene black or the like.

As the electrolyte, there can be used a nonaqueous electrolyte solution in which a lithium salt is dissolved in one or two or more nonaqueous solvents. The nonaqueous solvent is not especially limited, but examples thereof include cyclic carbonates such as ethylene carbonate (EC), propylene carbonate (PC), butylene carbonate (BC) and vinylene carbonate (VC); linear carbonates such as dimethyl carbonate (DMC), diethyl carbonate (DEC), ethyl methyl carbonate (EMC) and dipropyl carbonate (DPC); aliphatic carboxylate esters such as methyl formate, methyl acetate and ethyl propionate; γ-lactones such as γ-butyrolactone; linear ethers such as 1,2-ethoxyethane (DEE) and ethoxymethoxyethane (EME); and cyclic ethers such as tetrahydrofuran and 2-methyltetrahydrofuran. As the nonaqueous solvents, additionally, there may be used aprotic organic solvents such as dimethyl sulfoxide, 1,3-dioxolane, dioxolane derivatives, formamide, acetamide, dimethylformamide, acetonitrile, propionitrile, nitromethane, ethyl monoglyme, phosphate triesters, trimethoxymethane, sulfolane, methyl sulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole and N-methylpyrrolidone.

The lithium salt dissolved in the nonaqueous solvent is not especially limited, but examples thereof include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$ and lithium bisoxalatoborate. These lithium salts can be used singly or in a combination of two or more. A polymer electrolyte may be used in place of the nonaqueous electrolyte solution.

A separator can be provided between the positive electrode and the negative electrode. As the separator, there can be used a porous film, a woven fabric or a nonwoven fabric composed of a polyolefin such as polypropylene or polyethylene, a fluororesin such as polyvinylidene fluoride, a polyimide, or the like.

The battery shape includes a cylinder shape, a rectangular shape, a coin type, a button type and a laminate type. In the case of the laminate type, as an outer package accommodating the positive electrode, the separator, the negative electrode and the electrolyte, a laminate film is preferably used. The laminate film contains a resin base material, a metal foil layer and a thermal fusion layer (sealant). The resin base material includes polyester and nylon; the metal foil layer includes aluminum, aluminum alloy and titanium foils; and the material of the thermal fusion layer includes thermoplastic polymer materials such as polyethylene, polypropylene and polyethylene terephthalate. The resin base material layer and the metal foil layer each are not limited to of one layer, but may be of two or more layers. From the viewpoint of the versatility and the cost, an aluminum laminate film is preferable.

The positive electrode, the negative electrode, and the separator disposed therebetween are accommodated in an outer package container composed of a laminate film or the like; and an electrolyte solution is injected and sealed. A structure may be made in which a group of a plurality of electrode pairs stacked is accommodated.

EXAMPLES

The present invention will be described further by way of Examples hereinafter.

Example 1

An artificial graphite powder (spherical graphite) of 20 µm in average particle diameter and 1 $m^2/g$ in specific surface area was immersed in a 7 M KOH aqueous solution at room temperature for 12 hours (KOH treatment). Thereafter, the graphite powder was separated by vacuum filtration, and the graphite powder was subjected to a heat treatment in a nitrogen atmosphere at 800° C. for 1 hour. The graphite powder was washed with water, and thereafter dried at 70° C. for 24 hours to thereby obtain a graphite-based material having holes formed therein.

Example 2

A graphite powder having holes formed therein as in Example 1 was immersed in a 1 M sucrose aqueous solution, and mixed by a mixer for 10 min. Thereafter, the graphite powder was separated by vacuum filtration, and the graphite powder was subjected to a heat treatment in a nitrogen atmosphere at 1,000° C. for 3 hours to thereby obtain an aggregate of the graphite powder coated with an amorphous carbon. The obtained aggregate of the graphite powder was crushed to thereby obtain a graphite-based material having a predetermined average particle diameter.

Example 3

A graphite-based material having holes formed therein was formed as in Example 1, except for carrying out the heat treatment at 800° C. for 3 hours.

Example 4

A graphite-based material having holes formed therein was formed as in Example 1, except for carrying out the heat treatment at 1,000° C. for 1 hour.

Example 5

A graphite-based material having holes formed therein was formed as in Example 1, except for carrying out the heat treatment at 1,000° C. for 3 hours.

Example 6

The same artificial graphite powder (average particle diameter: 20 µm, specific surface area: 1 $m^2/g$) as that in Example 1 was coated with an amorphous carbon by CVD.

By using the obtained graphite powder, a graphite-based material having holes formed therein was formed as in Example 1.

Comparative Example 1

The same artificial graphite powder of 20 µm in average particle diameter and 1 $m^2/g$ in specific surface area as that in Example 1 was prepared, and was used as a negative electrode material as it was.

Comparative Example 2

The same artificial graphite powder of 20 µm in average particle diameter and 1 $m^2/g$ in specific surface area as that in Example 1 was immersed in a 7 M KOH aqueous solution for 12 hours, and irradiated with ultrasonic waves for 1 hour. The resultant graphite powder was washed with water, and thereafter dried at 70° C. for 24 hours.

Comparative Example 3

The same artificial graphite powder of 20 µm in average particle diameter and 1 $m^2/g$ in specific surface area as that in Example 1 was subjected to a heat treatment (gas activation treatment) in an argon atmosphere containing $CO_2$ (30%) at 500° C. for 3 hours.

(Measurement of the Crystal Structures of the Graphite-Based Materials)

Figure 3:
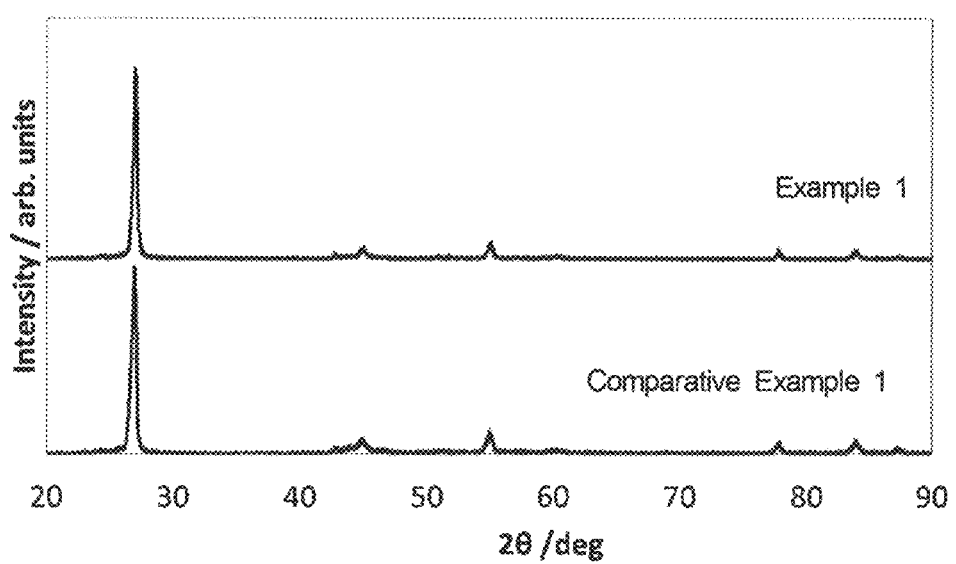
FIG. 3 is XRD patterns of the graphite-based material of Example 1 and a graphite of Comparative Example 1.

The crystal structures of the graphite powders of Example 1 and Comparative Example 1 were measured by X-ray diffractometry (XRD). The acquired XRD patterns are shown in FIG. 3. As shown in the figure, the XRD pattern did not change before and after the formation of the holes, revealing that the crystal structure of the graphite did not change. Therefore, it is clear that the treatments did not largely affect the crystal structure of the graphite and formed holes.

(Observation of the Surface of the Graphite-Based Materials)

The graphite powder immersed in the KOH aqueous solution and thereafter separated by vacuum filtration in Example 1 was observed by a scanning electron microscope. The SEM image is shown in FIG. 1. As shown in the figure, it is seen that crystals of KOH were spottedly formed on the graphene layer plane.

Figure 2:
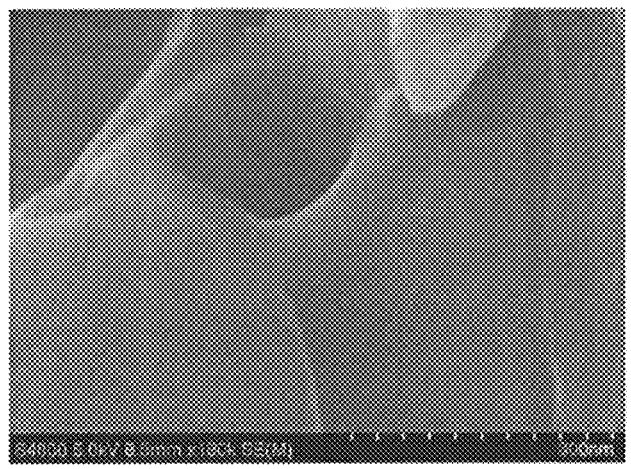
FIG. 2 is a SEM image of a graphite-based material of Example 1.

There is shown in FIG. 2 a SEM image of the graphite powder after the KOH aqueous solution immersion treatment and the heat treatment. As shown in the figure, it is seen that holes were formed in the graphene layer. It is seen that since holes were formed at positions corresponding to KOH crystals spottedly formed as shown in FIG. 1, holes as shown in FIG. 2 uniformly distributed over the whole of the graphene layer.

(Charge and Discharge Test)

A graphite material, a conductive agent (carbon black) and a binder (PVdF) were mixed in a mass ratio of graphite material:conductive agent:binder=92:1:7, and dispersed in NMP to thereby fabricate a slurry. The slurry was applied on a copper foil, dried and rolled, and thereafter the resultant was cut into 22×25 mm to thereby obtain an electrode. The electrode as a working electrode was combined with a Li foil of a counter electrode with a separator interposed therebetween to thereby obtain a laminate. The laminate and an electrolyte solution (a mixed solution of EC and DEC containing 1 M LiPF$_6$, volume ratio of EC/DEC=3/7) were sealed in an aluminum laminate container to thereby fabricate a battery.

At predetermined current values, charge (Li was intercalated in the working electrode) was carried out up to 0 V of the potential of the working electrode against the counter electrode, and discharge (Li was disintercalated from the working electrode) was carried out up to 1.5 V. With respect to the current values during the charge and discharge, a current value at which a discharge capacity of the working electrode was allowed to flow by taking 1 hour was taken as 1 C, and the charge and the discharge of the first cycle and the second cycle were carried out in 0.1 C charge-0.1 C discharge; and those of the third cycle, in 1 C charge-0.1 C discharge.

As charge and discharge characteristics, the initial discharge capacity (discharge capacity of the first cycle), the initial efficiency (discharge capacity of the first cycle/charge capacity of the first cycle) and the charge rate characteristic (discharge capacity of the third cycle/discharge capacity of the second cycle) were determined. The results are shown in Table 1.

TABLE 1

| | Heat Treatment After KOH Treatment | Initial Discharge Capacity (mAh/g) | Initial Efficiency (%) | 1 C/0.1 C Charge Rate Characteristic (%) |
|---|---|---|---|---|
| Example 1 | 800° C., 1 hour | 340 | 90 | 40 |
| Example 2 | 1,000° C., 3 hours | 345 | 93 | 43 |
| Example 3 | 800° C., 3 hours | 345 | 86 | 42 |
| Example 4 | 1,000° C., 1 hour | 350 | 87 | 43 |
| Example 5 | 1,000° C., 3 hours | 355 | 85 | 49 |
| Example 6 | 800° C., 1 hour | 347 | 93 | 45 |
| Comparative Example 1 | — | 320 | 92 | 4 |
| Comparative Example 2 | — | 313 | 89 | 5 |
| Comparative Example 3 | — | 228 | 73 | 12 |

As shown in Table 1, it is clear that by using the graphite-based materials (Examples 1 to 6) having holes formed in graphene layer planes, the charge rate characteristics were remarkably improved. It is also clear that by using the graphite-based material of Example 2 in which the graphite-based material of Example 1 was coated with an amorphous carbon, the capacity characteristic and the charge rate characteristic were more improved than in Example 1.

It is clear from Examples 1 to 6 that carrying out the heat treatment after the KOH treatment at 800 to 1,000° C. provided a larger effect of improving the characteristics. It is also clear that as increasing the heat treatment temperature from 800° C. to 1,000° C. (Example 1→Example 4, Example 3→Example 5), the capacities and the rate characteristics were raised. This is conceivably because inlets of small holes which could not house lithium ions were selectively expanded by the heat treatment after the KOH treatment and became able to house lithium.

Example 6 provided a higher capacity, initial efficiency and rate characteristic than in Example 1, since in Example 6, the graphite-based material was coated with an amorphous carbon as in Example 2. This is conceivably because the amorphous carbon coat suppressed side-reactions.

Further comparing Example 6 and Example 2, the capacity and the rate characteristic of Example 6 were higher in spite of a lower heat treatment temperature. This indicates that the formation of the amorphous carbon coat carried out before the formation of the holes provided the better effect than that after the formation of the holes. This is conceivably because when the amorphous carbon coat was formed before the formation of the holes, lithium ions could more smoothly pass through the holes, since the amorphous carbon coat was not present on hole parts after the formation of the holes. In Examples 2 and 6, the amorphous carbon coats were formed so that the thicknesses became 1 nm or larger and 50 nm or smaller.

Hitherto, the present invention has been described by reference to the exemplary embodiment and the Examples, but the present invention is not limited to the exemplary embodiment and the Examples. To the constitution and details of the present invention, various changes and modifications understandable to those skilled in the art may be made within the scope of the present invention.

This application claims priority right based on Japanese Patent Application No. 2013-74460, filed on Mar. 29, 2013, the entire disclosure of which is hereby incorporated by reference.

The invention claimed is:

1. A method for manufacturing a negative electrode carbon material for a lithium secondary battery, the negative electrode carbon material comprising a graphite-based material in which holes are formed in a plane of a graphene layer, the method comprising: subjecting a graphite to an immersion treatment with a KOH aqueous solution, separating the graphite by a solid-liquid separation, and thereafter subjecting the graphite to a heat treatment in an inert atmosphere to form the holes.

2. The method for manufacturing a negative electrode carbon material according to claim 1, wherein the heat treatment is carried out in a range of 800 to 1,000° C.

3. The method for manufacturing a negative electrode carbon material according to claim 1, further comprising coating the graphite with an amorphous carbon before forming the holes.

4. The method for manufacturing a negative electrode carbon material according to claim 1, wherein a concentration of the KOH aqueous solution is in a range of 0.1 M to 10 M.

5. The method for manufacturing a negative electrode carbon material according to claim 1, wherein after the solid-liquid separation, crystals of KOH are spottedly formed on the graphene layer in the graphite.

6. The method for manufacturing a negative electrode carbon material according to claim 1, wherein after the solid-liquid separation, crystals of KOH are spottedly formed on the graphene layer in the graphite, and after the heat treatment, the holes are formed at positions corresponding to the KOH crystals.

7. The method for manufacturing a negative electrode carbon material according to claim 1, wherein the immersion treatment is carried out in a range of 10° C. to 60° C.

8. The method for manufacturing a negative electrode carbon material according to claim 1, wherein the holes have a hole-opening size in a range of 10 nm to 1 μm.

9. The method for manufacturing a negative electrode carbon material according to claim 1, wherein the holes have a hole-opening size in a range of 10 nm to 1 μm, and the holes are each encircled by carbon atoms constituting the graphene layer.

10. The method for manufacturing a negative electrode carbon material according to claim 1, wherein the holes have a number density in a range of 10 to 200 holes/μm$^2$.

11. The method for manufacturing a negative electrode carbon material according to claim 1, wherein the holes are formed in a plurality of graphene layers such that the holes form paths penetrating through the plurality of graphene layers from a surface to an interior thereof.

\* \* \* \* \*